Figure 1:
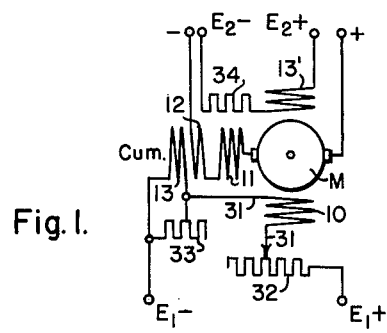

Aug. 17, 1965  D. M. CALABRESE ETAL  3,201,626
DIFFERENTIAL BIAS AUXILIARY COMMUTATING FIELD
Filed Jan. 29, 1962

WITNESSES:

INVENTORS
Daniel M. Calabrese and
Maurice J. Pasculle
BY
ATTORNEY

United States Patent Office 3,201,626
Patented Aug. 17, 1965

3,201,626
**DIFFERENTIAL BIAS AUXILIARY COMMU-
TATING FIELD**
Daniel M. Calabrese, Pitcairn, and Maurice J. Pasculle,
Wilkinsburg, Pa., assignors to Westinghouse Electric
Corporation, East Pittsburgh, Pa., a corporation of
Pennsylvania
Filed Jan. 29, 1962, Ser. No. 169,321
6 Claims. (Cl. 310—186)

The present invention relates to direct current motors and generators, and more particularly, to variable speed shunt motors of a size in which variation of the commutating pole excitation is required for good commutation under different shunt field conditions.

In large, variable speed, direct current motors, in which considerable speed variation is obtained by adjustment of the shunt field excitation, it has been known for some time that when the shunt field excitation is increased at some predetermined load, such as full load, increases must be made in the interpole flux which is produced by the series commutating pole winding. Otherwise, poor commutation results. In Patent No. 2,666,882 by Maurice J. Pasculle, issued January 19, 1954, and assigned to the assignee of the present invention, this problem is overcome by providing an auxiliary commutating pole winding which is energized so as to be responsive to adjustments in the excitation of the shunt type field winding but not directly responsive to the magnitude of the load current. In some instances, when this auxiliary commutating coil is employed, the interpole excitation may be excessive at no load, and particularly at top speed or weak field. In this case, some means is necessary to reduce the auxiliary winding excitation somewhat, and to reduce the effective excitation due to the auxiliary cumulative winding to zero. In the method described in the above-mentioned patent, it is not possible to reduce the excitation of the auxiliary cumulative winding to zero but a compromise auxiliary winding excitation is provided so as to obtain not quite the best commutation at full load but still giving preference to the commutation conditions at full load as distinguished from the commutation conditions at no load.

The principal object of the present invention is to provide an improved field structure which reduces or eliminates commutator sparking under weak field, no load conditions.

Another object of the invention is to provide improved commutation of an adjustable field, variable speed dynamoelectric machine by utilizing a constant potential differential auxiliary commutating field.

A further object of the invention is to provide improved commutation in an adjustable field, variable speed dynamoelectric machine which utilizes a cumulative auxiliary commutating field winding which is excited from the same current that is applied to the shunt field winding, and a differential auxiliary commutating winding which is excited by a constant potential source and produces a net auxiliary commutating field excitation of zero at weak field.

Figure 2:
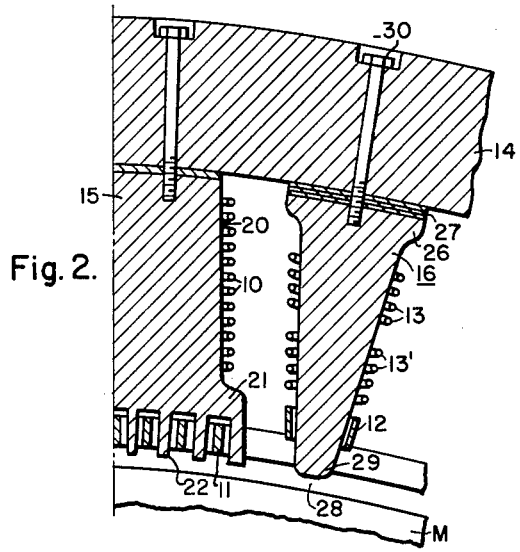

Other objects and advantages of the invention will be apparent from the following detailed description, taken in connection with the accompanying drawings, in which:

FIGURE 1 is a diagrammatic view of circuits and apparatus illustrating the invention in a preferred embodiment; and, FIG. 2 is a fragmentary view illustrating the positioning of the windings on the field frame of an illustrative motor or generator embodying the invention.

The invention, while not limited thereto, is particularly applicable to direct current shunt excited dynamoelectric machines particularly motors, in extremely large sizes, as for example, a 28 inch armature diameter to as large as or larger than 144 inch armature diameter or even larger machines. The invention is particularly applicable to variable speed motors in which the shunt field excitation is varied over a rather considerable range, for considerable speed variation or control. Such motors have application in steel mills and other industrial uses.

Briefly, the invention is embodied in a separately excited shunt type motor having a commutating winding and a compensating winding in series with the armature. An auxiliary commutating winding, which is accumulative with respect to the commutating and compensating windings, is provided and is illustrated in series with the separately excited shunt type field. A shunt field regulating means comprising a variable rheostat is provided to regulate or to adjust the shunt field excitation circuit and the auxiliary commutating winding is shunted by a variable resistance which serves as an adjustment means. A separately excited differential auxiliary commutating winding is provided on the interpole along with the cumulative auxiliary commutating winding and is energized or excited by a constant potential source of power. A variable resistance in series with the differential auxiliary commutating winding is provided for adjustment.

In FIG. 1, there is diagrammatically indicated the invention applied to a motor which includes an armature M, a shunt type field winding 10 which may be either separately or self-excited, a series compensating winding 11, a series commutating winding 12 and an auxiliary commutating winding 13. A differential winding 13′ that is, differential to the auxiliary commutating winding 13 and the main series commutating winding 12, is provided and is separately excited by a constant potential source. The motor is essentially a shunt motor, which either has no series field winding (as shown), or if a series field winding is used at all it will have only a small compounding effect. As shown in FIG. 2, the field frame of the motor comprises a cylindrical yoke 14, having main poles 15 and commutating poles or interpoles 16 bolted thereto. In accordance with known practice, the main poles have a pole shank portion 20, which carries the shunt field winding which is diagrammatically indicated at 10 in FIG. 2 and a pole tip portion 21 having slots 22 for receiving the compensating winding 11.

The interpole 16 carries the main or series commutating winding 12, the auxiliary commutating winding 13, and the differential bias auxiliary commutating winding 13′ all of which are diagrammatically indicated in FIG. 2. In accordance with a known practice, the rear end 26 of the interpole 16 is spaced from the yoke or frame member 14 by means of a plurality of magnetizable shims 27, the number of which can be varied, for the purpose of adjusting the effective interpolar air gap 28 between the face 29 of the interpole and the periphery of the armature or rotor member M. It will be understood that the number of the rear end shims 27 can be adjusted by removing the bolts 30 and then reassembling the interpole 16, with a desired number of shims.

Referring again to FIG. 1, it will be seen that the shunt field winding 10 is provided with field winding terminals which are marked $E_1-$ and $E_1+$. In most commercial applications of this invention, the shunt field winding 10 will be separately excited so that the field winding terminals $E_1-$ and $E_1+$ will be connected to a separate source of excitation, other than the voltage which appears across the terminals of the armature M, although the invention is also applicable to a self-excited machine, in which the field winding terminals $E_1-$ and $E_1+$ are connected across the supply line (+) (−), or across the terminals of the armature M. In either event, whether separately excited or self-excited, the shunt field winding 10 is necessarily provided with a shunt field excitation circuit 31 which includes a shunt field regulating means 32, either manual or automatic, for varying the excitation of the shunt field winding over a considerable range, this regulating means being indicated in the form of a field rheostat 32, which is intended to be representative of any field varying means.

The main armature circuit of the motor as shown in FIG. 1 is connected across a suitable constant voltage direct current supply line, represented by the terminals (+) (—), such as a 600 volt direct current line, for example. The series compensating winding 11 and the series commutating winding 12 are connected as a series winding circuit portion 11, 12, which is in turn connected in series with the armature M and all three serially connected parts are connected across the supply line represented by the terminals (+) (—).

When the shunt field winding 10 is separately excited, its excitation terminals $E_1+$ and $E_1-$ are commonly connected to a constant voltage supply line having a smaller voltage, for example 200 volts, although of course the invention is not limited to these details. For example, this invention may be embodied in any of the modifications illustrated in Patent No. 2,666,882, hereinabove referred to.

There is provided a commutation controlling means for variably exciting the auxiliary commutating winding 13. The auxiliary commutating winding 13 is wound with much smaller wires or conductors than the series commutating winding 12, and the auxiliary commutating winding 13 is adapted to carry much smaller currents than the series commutating winding 12. Also, in accordance with the present invention, the auxiliary commutating winding 13 is cumulative with respect to the main or series commutating winding 12. It is desirable in one aspect of this invention, that some means be provided for varying or controlling or regulating or adjusting the exciting current in the auxiliary commutating winding 13, either for making a preliminary general adjustment, suited to the individual requirements of an individual machine, or for adjusting excitation automatically with response to the magnitude of the shunt field adjustments of the machine.

In FIG. 1 there is shown excitation means or connections for causing the excitation of the auxiliary commutating winding 13 to vary in response to variations in the excitation of the shunt field winding 10. In many instances, the excitation of the shunt field winding 10 is varied by manual adjustments of the field rheostat 32, so as to vary the speed of the motor. In FIG. 1, the auxiliary commutating winding 13 is connected in series with the shunt field winding 10, and the auxiliary commutating winding 13 is shunted by a variable resistance shunt 33 which serves as an adjustment whereby to adjust the ratio of responsiveness of the excitation of the auxiliary commutating winding 13 in dependence upon the excitation of the shunt field winding 10.

The ideal interpolar or commutating excitation curve for a direct current machine, plotting the total effective ampere turns on the interpole 16, in excess of the excitation necessary for compensation, against the load or armature current, is a straight line, starting at zero ampere turns at no load, and running up to a certain definite magnitude or narrow range of magnitudes, at a predetermined load which is at least as large as full load, and sometimes higher than full load. In other words, the commutating conditions must be right, not only at no load, but also at this predetermined load value which is full load or higher than full load. It is essential that the total interpolar flux shall approximate an ideal value at the previously mentioned predetermined load condition which is at least as large as full load, even if the machine is an adjustable field variable speed motor, involving the adjustment of the shunt field current over a considerable range. The ideal value of the interpolar flux is different for different shunt field excitations and to provide the additional excitation required for good commutation under full load conditions, the cumulative auxiliary commutating winding 13 is provided.

The operation of this auxiliary commutating shunt field is more fully described in Patent No. 2,666,882 by M. J. Pasculle, issued January 19, 1954 and assigned to the assignee of the present invention. The adjustment of the interpolar flux is made initially at full load or greater. The adjustment is made by a proper adjustment or choice of the value of the resistance 33 and then that resistance value will thereafter remain unchanged throughout the subsequent use of the motor. In some instances, the excitation of the auxiliary cumulative interpole winding 13 is too great to be within the tolerable interpole excitation range at which sparkless commutation is obtained at no load, and particularly at no load with weak field or top speed. Thus, it may be necessary to reduce the auxiliary winding excitation so as to obtain the best commutation at no load and top speed.

At no load with weak field it is therefore desirable to reduce the effective M.M.F. of the auxiliary commutating winding 13 to zero. In the instant invention, this is accomplished by providing a differential auxiliary commutating winding 13' on the interpole 16. The differential auxiliary commutating winding 13' is connected in such polarity that its excitation is differential with respect to the excitation of the main or series commutating winding 12 and the cumulative auxiliary commutating winding 13. The differential auxiliary winding 13' is provided with terminals $E_2+$ and $E_2-$ and are separately excited from a constant potential source. A variable resistor 34 is connected in series with the differential auxiliary commutating winding 13'. The differential biased auxiliary commutating coil is separately excited from a constant potential source with about 10% to 20% as much capacity as the auxiliary commutating coil. It is wound on the commutating pole 16 differential to the commutating and auxiliary commutating coils 12 and 13 respectively. It is generally constructed similar to an auxiliary commutating coil but much smaller. It is adjusted by means of the rheostat 34 so that at weak field it will exactly cancel the M.M.F. produced by the auxiliary commutating coil. The strength of the differential bias auxiliary commutating coil is adjusted by the resistor 34 in series with the coil.

In operation, the armature current which flows through the main or series commutating pole winding 12 produces the main part of the total commutating pole excitation, this part being proportional to the armature current. A smaller part of the total commutating pole excitation is supplied by a smaller number of cumulative ampere turns by the cumulative auxiliary commutating coil 13 which are proportional to the field current or the field voltage of the main field excitation. The ampere turns supplied by the cumulative auxiliary commutating coil 13 are independent of the load. A differential bias is supplied by yet a smaller number of differential ampere turns supplied by the differential auxiliary commutating coil 13' which is separately excited and is constant.

Although a certain preferred embodiment of the invention has been shown and described for the purpose of illustration, it will be apparent that various other embodiments and modifications may be made. For example, the invention may be embodied in any of the modifications illustrated in Patent No. 2,666,882 referred to hereinabove. It is to be understood that the invention is not limited to the specific arrangements shown and described, but in its broadest aspects it includes all equivalent embodiments and modifications which come within the scope of the invention.

We claim as our invention:

1. A variable speed direct current motor including an armature, a shunt type field winding, a shunt field excitation circuit including means for varying the excitation of said shunt type field winding over a considerable range, a series compensating winding, a series commutating winding, a first auxiliary commutating winding, means for energizing the auxiliary commutating winding from the excitation circuit of the shunt type field winding, and a second auxiliary commutating winding, said second auxiliary commutating winding being wound differential to the first auxiliary commutating winding.

2. A variable speed direct current motor including an armature, a shunt type field winding, means for varying the excitation of said shunt type field winding over a considerable range, a series compensating winding, a series commutating winding, a first auxiliary commutating winding, means for energizing the first auxiliary commutating winding in a ratio of responsiveness dependent upon the excitation of the shunt field winding, and a second auxiliary commutating winding, said second auxiliary commutating winding being wound differential to the first auxiliary commutating winding and excited independently thereof.

3. A variable speed direct current motor including an armature, a shunt type field winding, means for varying the excitation of said shunt type field winding over a considerable range, a series compensating winding, a series commutating winding, an auxiliary commutating winding, and means for reducing the effect of said auxiliary commutating winding to zero at a pre-selected speed greater than the base speed.

4. A variable speed direct current motor including an armature, a shunt type field winding, means for varying the excitation of said shunt type field winding over a considerable range, a series compensating winding, a series commutating winding, a cumulative auxiliary commutating winding, means for energizing the cumulative auxiliary winding from the excitation circuit of the shunt type field winding, and a differential auxiliary commutating winding.

5. A variable speed direct current motor including an armature, a shunt type field winding, means for varying the excitation of said shunt type field winding over a considerable range, a series compensating winding, a series commutating winding, the excitation of the shunt type field winding being cumulative with respect to the excitation of the series commutating winding, and a second auxiliary commutating winding, said second auxiliary commutating winding being differential with respect to the excitation of the series commutating winding and energized from an independent constant potential source.

6. A variable load, variable speed dynamoelectric machine including an armature, a shunt type field winding, a shunt field excitation circuit including a shunt field regulating means for varying the excitation of said shunt type field winding over a considerable range, a series compensating winding, a series commutating winding, first means for varying the excitation of said series commutating winding in a ratio of responsiveness dependent upon the excitation of the shunt type field winding, and other means for applying a constant differential bias to said first means.

References Cited by the Examiner

UNITED STATES PATENTS

| | | | |
|---|---|---|---|
| 2,235,075 | 3/41 | Kimball | 310—186 |
| 2,270,708 | 1/42 | Merrill | 318—351 |
| 2,483,146 | 9/49 | Merrill | 310—187 |
| 2,705,772 | 4/55 | Petit | 310—186 |

ORIS L. RADER, *Primary Examiner*.

MILTON O. HIRSHFIELD, *Examiner*.